Figure 1A:
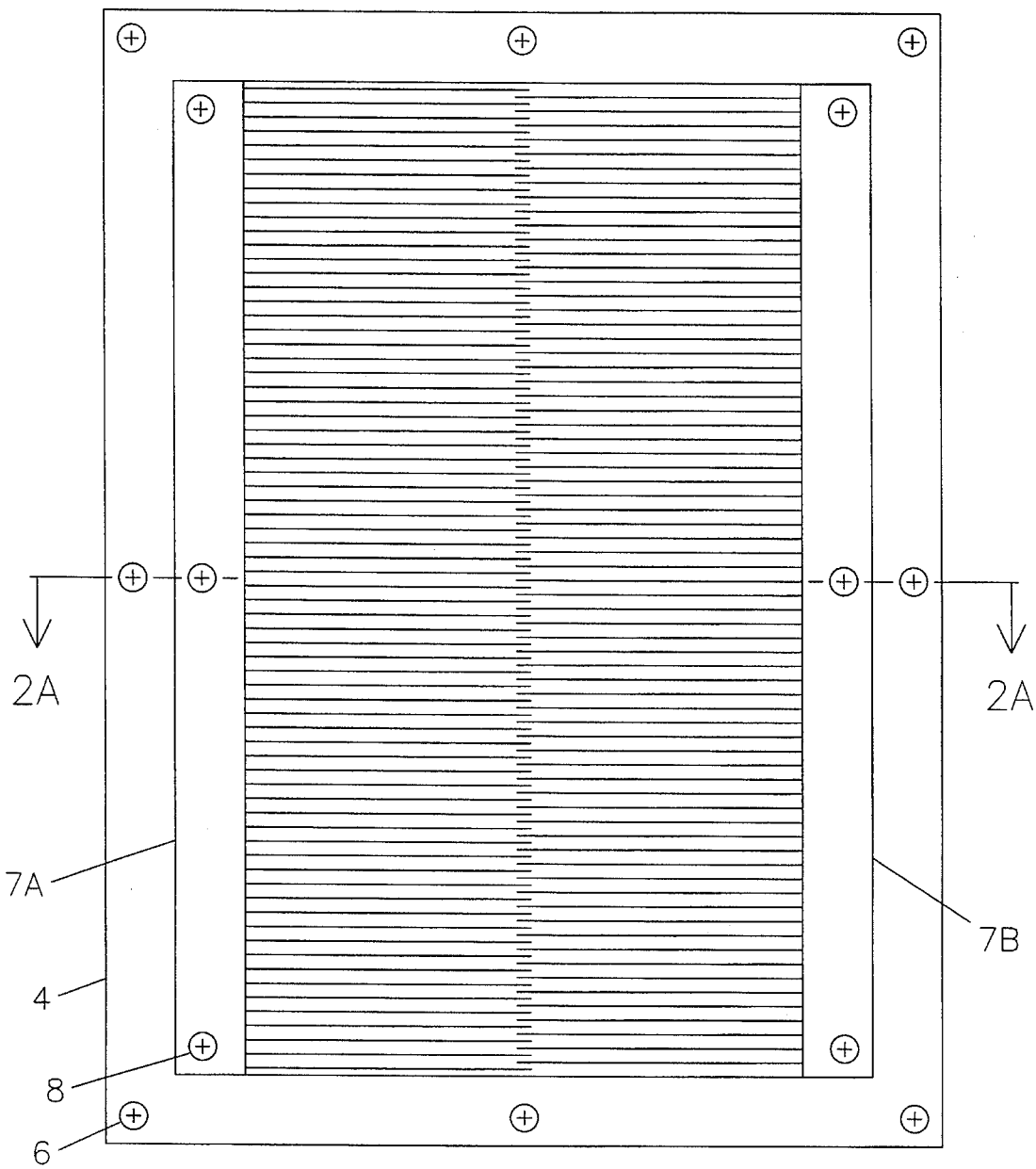

United States Patent [19]
Brown

[11] Patent Number: 5,546,895
[45] Date of Patent: Aug. 20, 1996

[54] GROOMING BRUSH PET DOOR

[76] Inventor: Thomas E. Brown, Star Rt., Box 452, Lottsburg, Va. 22511

[21] Appl. No.: 524,634
[22] Filed: Sep. 7, 1995
[51] Int. Cl.⁶ .......................... A01K 1/035; A01K 13/00
[52] U.S. Cl. ............................. 119/484; 119/622; 119/625
[58] Field of Search ........................... 119/823, 86, 15, 119/19, 157; 15/21.1, 88.1

[56] References Cited

U.S. PATENT DOCUMENTS

| | | | |
|---|---|---|---|
| 2,976,841 | 3/1961 | Scheffer | 119/83 |
| 3,285,231 | 11/1966 | Johnson | 119/157 |
| 4,301,766 | 11/1981 | Piccone | 119/83 X |
| 4,938,169 | 7/1990 | Barmakian | 119/83 |
| 4,965,906 | 10/1990 | Mauro | 15/88.1 |
| 5,458,088 | 10/1995 | Owens | 119/86 |

FOREIGN PATENT DOCUMENTS 320134  1/1902  France ..................................... 15/88.1

Primary Examiner—Robert P. Swiatek
Assistant Examiner—Elizabeth Shaw

[57] ABSTRACT

A pet door consisting of an opening filled by the bristles of a brush or brushes. An animal moves through the opening by pushing aside the flexible bristles, which reliably and quietly reseal the opening after the animal passes. Moving through the brushes is as natural to an animal as moving through tall grass or underbrush. The brushes perform a grooming function by removing dirt and debris from the animal's coat as it enters. The brushes have high insulating value due to the volume of air trapped among the bristles.

6 Claims, 2 Drawing Sheets 5,546,895

GROOMING BRUSH PET DOOR

BACKGROUND

1. Field of Invention

This invention relates to doors, specifically pet doors, for use by animals.

2. Prior Art

A pet door is a great convenience to the owner of a cat, dog, or other animal which can be trained to use such a door. The pet door relieves the owner of the burden of opening a door for the animal whenever it needs to go out or come in. It reduces the irritation to owner and neighbors from dogs barking to gain entry. It also prevents damage to doors and walls by the animal scratching to request entry or exit, and the soiling of floors if the door isn't opened soon enough. The prior art in pet doors has produced a variety of doors based on hinged panels or flexible flaps. The following is a list of characteristics that a good pet door should have, and the ways in which the hinged panels and flexible flaps can be deficient:

(a) It should not be intimidating to the animal. Pushing aside a hinged panel or flexible flap is an unnatural and threatening experience to some animals, especially those with tails to be caught by the closing door.

(b) It should be easily operated by the animal. A hinged panel or flexible flap which seals adequately against wind and rain is often difficult for the animal to break loose from the sealed position.

(c) It should provide good closure against wind, rain, insects, dust, and debris. A hinged panel or flexible flap which is light enough to be easily operated by the animal is often easily blown open by the wind.

(d) It should have good insulating qualities. The thin cross section of hinged panels and flexible flaps offers poor insulation.

(e) It should be economical to purchase and maintain. Elaborate seals and hinges used in hinged panels and flexible flaps result in high purchase and repair costs.

(f) It should operate quietly. Hinged panels and flexible flaps often close with a sound loud enough to frighten the animal and annoy its owner.

(g) It should not stick, jam, or bind. Pet doors based on hinged panels or flexible flaps rely on close tolerances for proper seal, often resulting in sticking, jamming or binding due to dirt, ice, or wear.

There is a need for an improved pet door which has not only all of the above characteristics which are collectively hard to achieve, but also the previously unappreciated characteristic of grooming the animal as it enters or exits.

OBJECTS AND ADVANTAGES

Accordingly, the advantages of the grooming brush pet door are (1) that it grooms the animal, brushing leaves, dirt, and debris from the animal's coat as it enters, and (2) that the previously listed characteristics of a good pet door are satisfied as follows:

(a) It is not intimidating to the animal. This pet door simulates the totally natural experience to an animal of pushing through underbrush. There is no possibility of catching the animal's tail or frightening the animal with noise of operation.

(b) It is easily operated by the animal. This pet door has low initial resistance and no hard or heavy object to set in motion.

(c) It provides good closure against wind, rain, insects, dust, and debris. This pet door has high wind and infiltration resistance and reliably returns to a sealed position.

(d) It provides good insulation. This pet door is not restricted to thin materials. As in a thatched roof, dead air spare and bulky materials with low thermal conductivity provide inherently good insulation.

(e) It is economical to construct and repair. A small number of low tolerance, long wearing, easily manufactured parts will keep this pet door economical to produce and repair.

(f) It will operate quietly. There are no noise producing closures possible with this pet door.

(g) It will not stick, jam, or bind. The simple, low tolerance closure system of this pet door offers freedom from failures.

DRAWING FIGURES

Figure 2A:
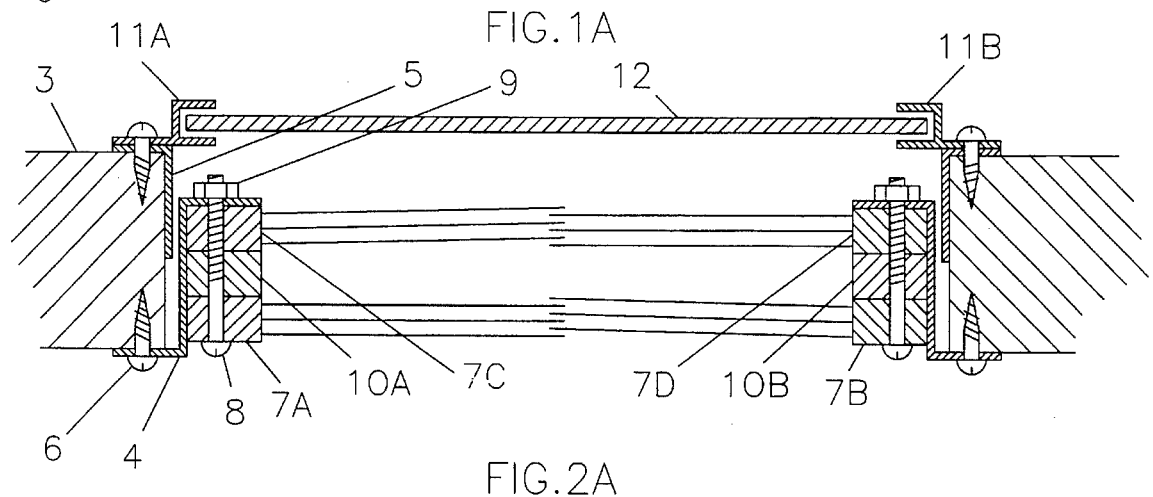

In the drawings FIGS. 1A and 2A show the outside view and cross section of one embodiment of the invention.

Figures 1B, 2B:
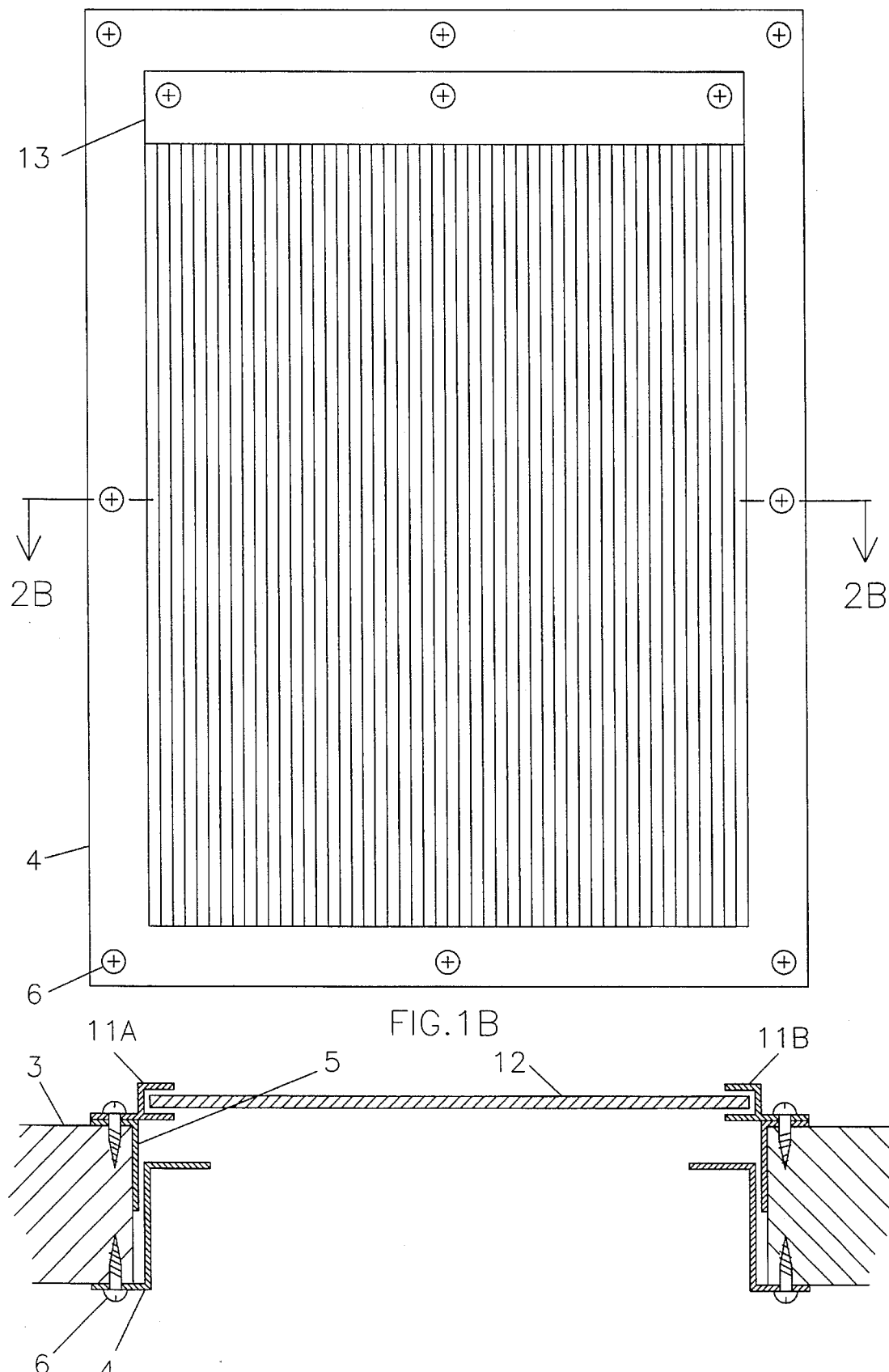

Figs 1B and 2B show the outside view and cross section of another embodiment.

| Reference Numerals in Drawings | |
| --- | --- |
| 3 door or wall of building | 4 outer frame |
| 5 inner frame | 6 screw type fastener |
| 7A, 7B, 7C, 7D brushes | 8 bolt type fastener |
| 9 nut | 10A, 10B spacers |
| 11A, 11B channels | 12 moveable panel |
| 13 brush | |

DESCRIPTION

FIGS. 1A to 2B

A typical embodiment of the present invention of a grooming brush pet door is shown in FIG. 1A (outside view) and FIG. 2A (cross section). An outer frame 4 is fastened on the outside of an opening in a door or wall 3 of a building using fasteners typified by a screw 6. An inner frame 5 is similarly fastened to the inside of the wall or door. A brush 7A is fastened to a side of the outer frame 4 by a fastener typified by a bolt 8 and a nut 9. A brush 7B is similarly fastened to the other side of the outer frame such that the bristles of the brushes meet and seal the opening. In this particular embodiment for colder climates, an additional pair of brushes shown as a brush 7C and a brush 7D have been fastened to the outer frame. A spacer 10A and a spacer 10B create additional dead air space between the pairs of brushes for enhanced insulation. A channel 11A and a channel 11B are fastened to the sides of the inner frame. A moveable panel 12 slides in the channels to prevent use of the door at times.

Another embodiment of the pet door is shown in FIG. 1B (outside view) and FIG. 2B (cross section). In this embodiment a single brush 13 is fastened to the top of the outside frame. The bristles of the brush fill the opening and sweep against the bottom of the outer frame.

OPERATION

FIGS. 1A, 2A, 1B, 2B

The operation of the two embodiments of the pet door shown in the drawings is the same. To enter or exit using the pet door, an animal pushes through the opening filled by the bristles of the brush or brushes. The flexible bristles are easily pushed aside and return to position after the animal has passed through. As the animal enters, the brushes perform a grooming action by brushing dirt or debris from the animal's coat. The inner and outer frames bypass to accommodate installation in doors or walls of varying thickness. The moveable panel slides in the channels to bar or allow entry and exit as desired. The insulating value and effectiveness of the bristles against infiltration by wind, rain, dust, and debris depend on the number of brushes installed and the density and flexibility of the bristles. Thus, this pet door can be easily adapted for a wide range of climates by changing the number or type of brushes.

SUMMARY

The grooming brush pet door incorporates all the desired features of a good pet door while performing the additional service of brushing the animal's coat to remove dirt and debris as it enters a building. This pet door is unique in that it simulates to an animal the natural experience of moving through tall grass or underbrush. This pet door does not intimidate animals with a resistant solid surface, noisy operation, and the threat of a pinched tail. By using simple, low tolerance, easily manufactured and long-wearing parts, this pet door solves the problems of faulty operation and costly repair. This pet door has high inherent insulation, not achieved in prior art doors with panels or flaps constructed of thin, dense material.

The description above illustrates two preferred embodiments of the grooming brush pet door but should not be construed as limiting the scope of the invention as determined by the appended claims.

What is claimed is:

1. A pet door comprising:
   (a) an opening in a building, and
   (b) a brush fastened in said opening such that only the bristles of said brush substantially completely fill said opening but permit passage of an animal through said opening.

2. A pet door as in 1 including a frame means in said opening to facilitate fastening said brush in said opening.

3. A pet door as in 2 including a moveable panel means attached to said frame for the purpose of sometimes preventing passage of said animal.

4. A pet door comprising:
   (a) an opening in a building, and
   (b) a plurality of brushes fastened in said opening such that the tips of the bristles of said brushes meet and fill said opening but permit passage of an animal through said opening.

5. A pet door as in 4 including a frame means in said opening to facilitate fastening said brushes in said opening.

6. A pet door as in 5 including a moveable panel means attached to said frame for the purpose of sometimes preventing passage of said animal.

* * * * *